United States Patent

[11] 3,612,762

[72] Inventors Louis E. Wuellner
Fort Wayne;
Roger C. Thieme, Hoagland, both of Ind.

[21] Appl. No. 810,714
[22] Filed Mar. 26, 1969
[45] Patented Oct. 12, 1971
[73] Assignee International Telephone and Telegraph Corporation
Nutley, N.J.

[54] AUTOMATIC GAIN CONTROL SYSTEM FOR CAMERA TUBE

7 Claims, 5 Drawing Figs.

[52] U.S. Cl. .......... 178/7.2, 178/DIG. 29, 315/11
[51] Int. Cl. .......... H04n 5/36
[50] Field of Search .......... 315/11; 178/DIG. 29

[56] References Cited

UNITED STATES PATENTS

| | | | |
|---|---|---|---|
| 3,487,259 | 12/1969 | Anderson | 315/11 |
| 3,128,408 | 4/1964 | Goodrich et al. | 313/68 X |
| 3,437,749 | 4/1969 | Klem | 178/7.2 E |

*Primary Examiner*—Robert L. Griffin
*Assistant Examiner*—George G. Stellar
*Attorneys*—C. Cornell Remsen, Jr., Walter J. Baum, Percy P. Lantzy, Philip M. Bolton, Isidore Togut, Charles L. Johnson, Jr. and Hood, Gust, Irish and Lundy

ABSTRACT: In low-light level television systems, certain camera tubes employ multiplier-channel plates which determine the gain of the camera tube. This gain is automatically controlled in the present invention by developing a control signal representative of the amplitude of the video signal produced by the camera tube and feeding it back to the multiplier-channel plate in such polarity and magnitude as to maintain the video signal at a substantially constant level.

INVENTORS:
LOUIS E. WUELLNER,
ROGER C. THIEME,
BY Wood, Gust, Irish & Lundy
ATTORNEYS.

INVENTORS:
LOUIS E. WUELLNER,
ROGER C. THIEME,
BY Wood, Herst, Oriel & Lundy
ATTORNEYS.

AUTOMATIC GAIN CONTROL SYSTEM FOR CAMERA TUBE

BACKGROUND OF THE INVENTION

1. Field of the Invention

The present invention relates generally to television camera systems and more particularly to camera systems in which the video signal output is maintained at a substantially constant level.

2. Description of the Prior Art

Camera tubes employed in low-light level television systems under certain circumstances must operate in response to reflected spectral energy originating with the moon or stars and thermal emission on the earth's surface. Typical of such camera tubes are image orthicons, vidicons, SEC vidicons, and multiplier-channel plate tubes. These tubes generally are considered to possess excellent sensitivity and reliability, but common to all of them is the problem that with the camera adjusted to operate under the lowest light level conditions, a sudden flash of light or radiation can result in "blooming," a condition resulting from overexcitation or saturation of the tube.

The present invention is directed primarily to the camera tube which employs a multiplier-channel plate which determines gain. The multiplier-channel plate provides signal gain determined by the magnitude of an operating potential applied thereto. This multiplier-channel plate is primarily an electron multiplier which produces an output current roughly proportional to input current. However, if the input current exceeds a certain value, the multiplier becomes saturated such that additional input results in no change in the output current.

In a camera tube, the input current is determined by the ambient light level such that if this level exceeds a predetermined value, the multiplier will be driven to saturation, thereby destroying the fidelity of the video signal. Thus it is important that the multiplier-channel plate be operated in such a manner as to prevent saturation but at the same time provide maximum gain and sensitivity for the camera tube.

Gain of the multiplier-channel plate and consequent sensitivity of the camera tube can be automatically controlled by maintaining the operating potential applied thereto at levels which will prevent the plate from reaching saturation conditions. This is accomplished by providing a variable voltage power supply coupled to the multiplier-channel plate and supplying a control signal to the power supply which maintains the level of the voltage applied to the plate within proper operating limits. In one prior art arrangement, the control signal is obtained by sampling the very small DC current in the photocathode lead of the camera tube. In another instance, a photocell separate and apart from the camera tube is positioned to receive substantially the same radiation as the camera tube and thereby to develop a signal representative of the observed light level which controls the amplitude of the voltage delivered by the power supply. Other techniques have been proposed, however, they are not as efficacious as required under conditions of operation required of the camera tube.

SUMMARY OF THE INVENTION

In accordance with the broader aspects of this invention, the video output signal itself is sampled for the purpose of developing a control signal whereby the gain of the multiplier-channel plate can be controlled effectively such that the camera tube is maintained operational at maximum sensitivity. In this system, a television camera tube has a first electrode arrangement for generating a video signal corresponding to an optical image applied to the camera tube, and a multiplier-channel plate which serves as a second electrode for controlling the gain of the tube. The video output signal is sampled and converted into a unidirectional potential of an amplitude representative of that of the video signal, this potential being utilized to control the output voltage of a power supply which is connected to the multiplier-channel plate. The polarity and amplitude of the control potential are predetermined such that the gain of the multiplier-channel plate is regulated to remain within the unsaturated operating conditions thereof.

It is therefore an object of this invention to provide a system for automatically controlling the gain of the camera tube in a camera system, in response to the brightness of a scene being observed.

It is another object of this invention to provide in a television camera system a unique arrangement for controlling the gain of the camera tube which employs a multiplier-channel plate such that the camera tube is prevented from being saturated by reason of excessive light levels in the scene being observed.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

DESCRIPTION OF THE PREFERRED EMBODIMENT

Figure 3:
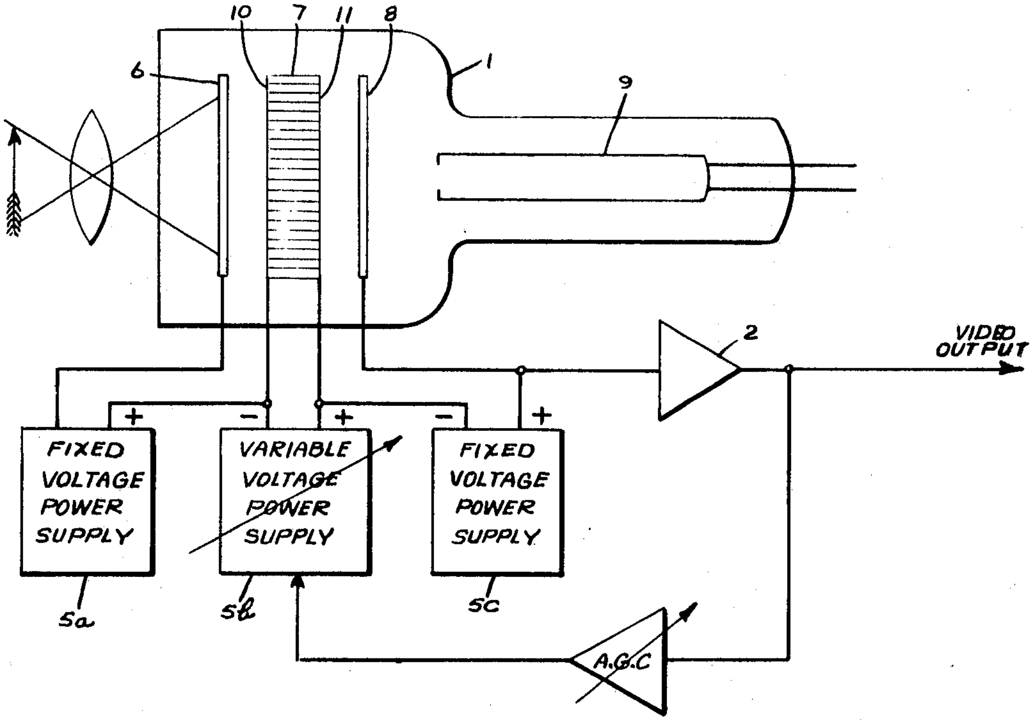
FIG. 3 is a more detailed block diagram of the embodiment of FIG. 1.
Figure 1:
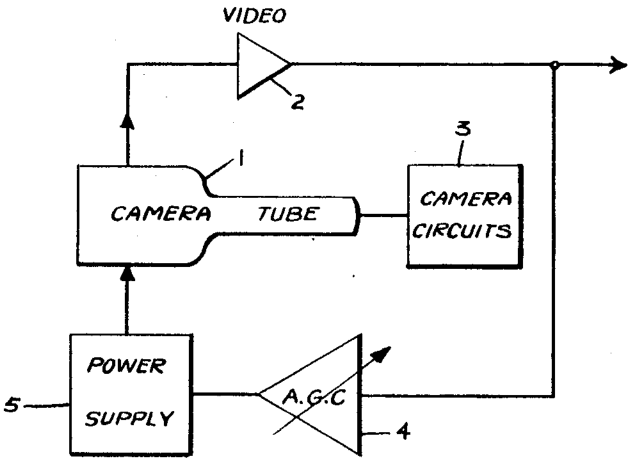
FIG. 1 is a block diagram of one embodiment of this invention.
Figure 2:
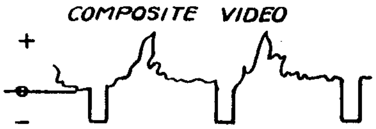
FIG. 2 is a wave form of the composite video output signal generated by the camera tube and video circuits of FIG. 1.

Referring to the drawings, and more particularly to FIGS. 1, 2 and 3, a camera tube 1 has coupled to the output circuit thereof a video amplifier 2. Also connected to the camera tube 1 are the usual camera circuits 3 which supply the scanning and synchronizing signals, operating potentials and the like. Connected to the output circuit of the video amplifier 2 is an automatic gain control device 4 which produces a unidirectional potential by sampling the peak video portions of the composite video signal appearing in the output circuit of the video amplifier 2. A power supply 5 is connected to the camera tube 1 to supply the necessary operating potentials, one part of this power supply 5 being a variable voltage section which is controlled by the output voltage from the automatic gain control device 4. In FIG. 3, the components that make up the power supply 5 are indicated by the numerals 5*a*, 5*b* and 5*c*, the two sections 5*a* and 5*c* supplying fixed voltages and the section 5*b* a variable voltage as just described.

Within the camera tube 1 are the usual components, an extended area, photoelectric cathode 6, a multiplier-channel plate 7, an extended area target electrode 8, and a readout electron gun 9. The electrodes 6, 7 and 8 are disposed in close proximity to each other so as to provide proximity focusing of electrons traversing the spaces therebetween. In other tube configurations, focusing may be accomplished by electrostatic or magnetic lenses in accordance with conventional practice.

Conventionally, the multiplier-channel plate 7 is composed of a bundle of exceedingly small hollow fibers. The inside of each fiber is coated with a material which emits secondary electrons at a ratio greater than unity. On the opposed surfaces of the plate 7 are conductive coatings 10 and 11 which serve as terminals for each fiber to which a unidirectional potential may be applied. Such a potential produces an electric field along the length of each fiber, thereby accelerating electrons from the input to the output portions thereof, the input being on the side 10 and the output on the side 11. In use, an image observed by the camera tube 1 is focused onto the photocathode 6. Electrons emitted by the cathode 6 are imaged onto the surface 10 of the multiplier-channel plate 7 which intensifies the electron image by many times ranging from thousands to millions depending upon the operating voltages. The plate output is proximity-focused onto the storage target 8 which has the reverse side thereof scanned by the readout gun 9. The electron beam emitted by the gun 9 preferably is scanned over the target plate 8 according to the pattern and rates of the customary television rasters such that a composite video signal as indicated in FIG. 2 is developed. This composite signal includes the usual video and synchronizing components as shown. In the working embodiment, the video component of the signal of FIG. 2 is positive-going and corresponds to white in the reproduced television picture. The synchronizing signal is clamped to ground and the automatic gain control device 4 serves to strip the video component from the composite signal, amplify and peak detect the same. The resulting unidirectional potential is then amplified and inverted then fed to an emitter-follower driver which supplies the input voltage for the multiplier-power supply *5b*. As photocathode illumination varies, the peak video level varies, indicating a need for change in gain of a multiplier-channel plate. This video level or amplitude variation is sensed by the automatic gain control device 4, the resulting error voltage being fed to the multiplier power supply changing the channel-multiplier plate gain so as to return the video signal to the originating level.

Figure 4:
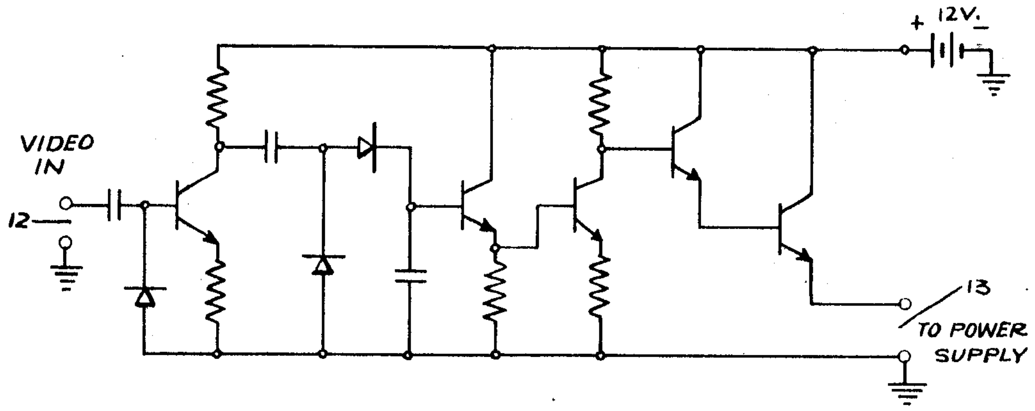
FIG. 4 is a schematic diagram of the automatic gain control device of FIG. 3.
Figure 5:
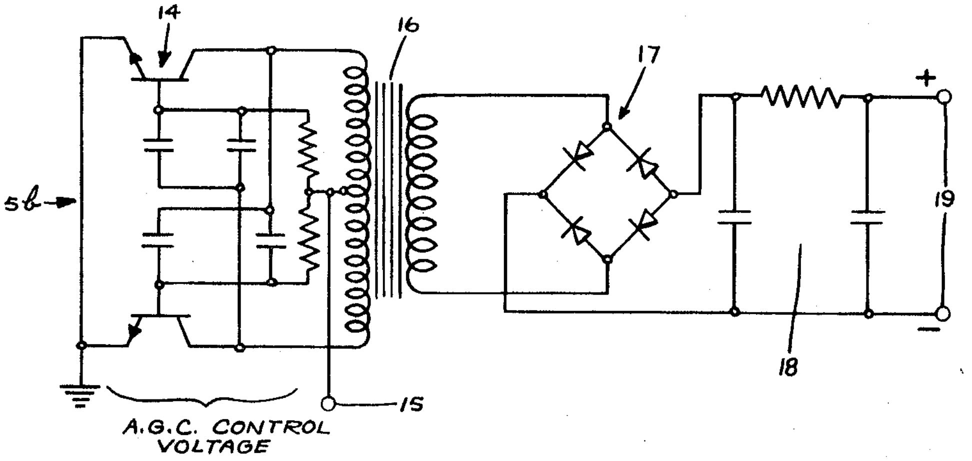
FIG. 5 is a schematic diagram of the power supply utilized to drive the multiplier-channel plate of the camera tube of the preceding FIGS.

The automatic gain control device 4 is shown schematically in FIG. 4, the input terminals 12 thereof being connected to the output circuit of the video amplifier 2 and the output terminal 13 being connected to the power supply *5b*. A suitable working embodiment of such a power supply *5b* is shown in FIG. 5.

The circuit of FIG. 4 is so arranged as to strip out the video components only of the composite signal of FIG. 2, amplify this signal, and then peak detect it. Thus, only the peak portions of the video signal are utilized, these being converted into a unidirectional potential which is coupled to the power supply *5b* of FIG. 5. This power supply includes an oscillator 14 having input terminals 15 which are connected to the output terminals 13 of the gain control device of FIG. 4. The oscillator 14 is coupled to the primary winding of the high-voltage transformer 16 which has the secondary winding thereof connected to a bridge rectifier 17 and a filtering network 18. The output terminals 19 of the power supply are connected to the multiplier-channel plate 7 according to the polarities shown in FIG. 3.

In operation, as the amplitude of the video signal developed by the camera tube 1 and amplified by the amplifier 2 increases, this increase being due to increased illumination of the photocathode 6, a voltage is developed in the control device 4 which biases the oscillator 14 to operate at a lower voltage. This results in the power supply *5b* delivering a lower output voltage which is applied to the multiplier plate 7, thereby reducing the gain of the latter. This results in the amplitude of the video signal being reduced to a normal operating level at which the control device 4 develops a voltage that maintains the level of voltage developed by the power supply *5b* constant. The parameters of the circuits of FIGS. 4 and 5 are so selected that any change in amplitude, either upwardly or downwardly, of the video signal from a predetermined level will result in a corresponding feedback signal which will make an adjustment in the gain of the multiplier channel plate 7 so as to return the video signal to the predetermined level.

Camera tube 1, therefore, may be prevented from overloading such that the sensitivity of the tube may be maintained at an optimum level at all times, even though bright flashes may momentarily enter the scene being viewed. This method of controlling the gain of the tube is superior to any of the other known methods for the reason that the signal which is generated by the tube itself is the one that determines the character of the control voltage that is fed back to the multiplier-channel plate. The magnitude of the developed video signal is sufficient to provide an efficacious control signal in contrast with prior methods of utilizing the photocathode current which is so small as to make it exceedingly difficult to obtain adequate control. With respect to the prior method of utilizing a separate photocell for observing the same scene being viewed by the camera tube 1, this of course is a separate system which cannot respond sufficiently identically to the camera tube as to provide the necessary control.

The present invention is also advantageous in the respect that the video signals out of the video amplifier 2 can be detected on the basis of the peak white or average white per scan line or even average white per picture frame. The choice of these three methods of detecting the video signal depends upon the particular application of the camera system. The operating characteristics of the circuits of FIGS. 4 and 5 would of course need to be modified so as to adapt the operation to whichever of these three methods may be desired.

The present invention provides the reliability needed from the standpoints of speed of operation as well as the efficacy thereof whereby camera operation may be maintained at optimum sensitivity for substantially the entire period a scene is being viewed.

While there have been described above the principles of this invention in connection with specific apparatus, it is to be clearly understood that this description is made only by way of example and not as a limitation to the scope of the invention.

We claim:

1. A television system comprising:

an image tube having means for converting an optical image into an electron image, an electron multiplier for amplifying said electron image, said multiplier having a pair of electrodes at opposite sides thereof, means for storing the amplified electron image, and means for scanning said image storing means to provide a video output signal representing said optical image, means responsive to the amplitude of said video signal for generating a feedback control signal, and means responsive to said feedback control signal for applying a unidirectional potential across said electrodes at opposite sides of said electron multiplier, said potential automatically varying in accordance with said feedback control signal to maintain the amplification of said electron multiplier within a predetermined range.

2. The system according to claim 1, wherein said electron multiplier is a channel plate multiplier having said pair of electrodes on opposite sides thereof, said electrodes being parallel and having conductive coatings thereon and a plurality of hollow longitudinal fibers having secondary electron emissive coatings therein disposed between said electrodes, said means responsive to said feedback control signal including a variable voltage power supply applying said unidirectional potential to said electrodes.

3. The system according to claim 2, wherein said multiplier has linear and saturation regions of amplification response characteristics, and said means responsive to said feedback control signal limits the operation of said multiplier below its saturation region.

4. The system according to claim 2 further including a video amplifier interposed between said storing means and said feedback control signal-generating means.

5. The system according to claim 2, wherein said image converting means includes an extended area photoelectric cathode and said image storing means includes an extended area target, a first source of fixed operating voltage connected between said cathode and one of said parallel electrodes, and a second source of fixed operating voltage connected between the other of said parallel electrode plates and said target.

6. The system according to claim 5, wherein said feedback control signal-generating means includes an automatic gain control circuit having circuit means for detecting the peaks of said video output signal and for reconverting the detected peaks of said video signal into a unidirectional potential signal.

7. The system according to claim 6, wherein said means responsive to said feedback control signal includes an oscillator responsive to said unidirectional potential signal, a full-wave rectifier, a transformer for coupling said oscillator to said rectifier, and a filter network, the output terminals of said filter network being connected to said pair of electrodes of said multiplier.